United States Patent [19]

Carolan

[11] 4,230,200
[45] Oct. 28, 1980

[54] TWO-STAGE DEADMAN CONTROL FOR WALK-BEHIND MOWERS

[75] Inventor: Donald L. Carolan, Beaver Dam, Wis.

[73] Assignee: Deere & Company, Moline, Ill.

[21] Appl. No.: 40,627

[22] Filed: May 21, 1979

[51] Int. Cl.³ .................. B62D 51/04; B60K 26/00
[52] U.S. Cl. .......................... 180/272; 180/19 H; 192/99 S
[58] Field of Search ............. 192/99 S; 56/10.8, 11.8, 56/11.3; 74/551.1, 2; 180/272, 19 H, 77 R, 77 H; 16/111 A

[56] References Cited

U.S. PATENT DOCUMENTS

| | | | |
|---|---|---|---|
| 3,942,604 | 3/1976 | Black | 180/272 |
| 4,132,280 | 1/1979 | Jones | 180/19 H |
| 4,167,221 | 9/1979 | Edmonson | 180/19 H |

Primary Examiner—John J. Love
Assistant Examiner—Randall A. Schrecengost

[57] ABSTRACT

A self-propelled walk-behind mower includes blade and traction drive clutch control levers associated with a deadman control lever which operates a pair of lever latches such that it is necessary for the deadman control lever to be held depressed against the guide handle of the mower to allow the blade and traction drive control lever to be held in respective clutch-engage positions, the control levers being biased to automatically return to respective clutch-disengage positions once the deadman control lever is released. A pair of latch release levers are respectively operative to selectively actuate one or the other of the lever latches so as to permit one or the other of the blades and traction drive control clutches to automatically return to its clutch-disengage position when the deadman control lever is held depressed against the operator's handle.

14 Claims, 9 Drawing Figures

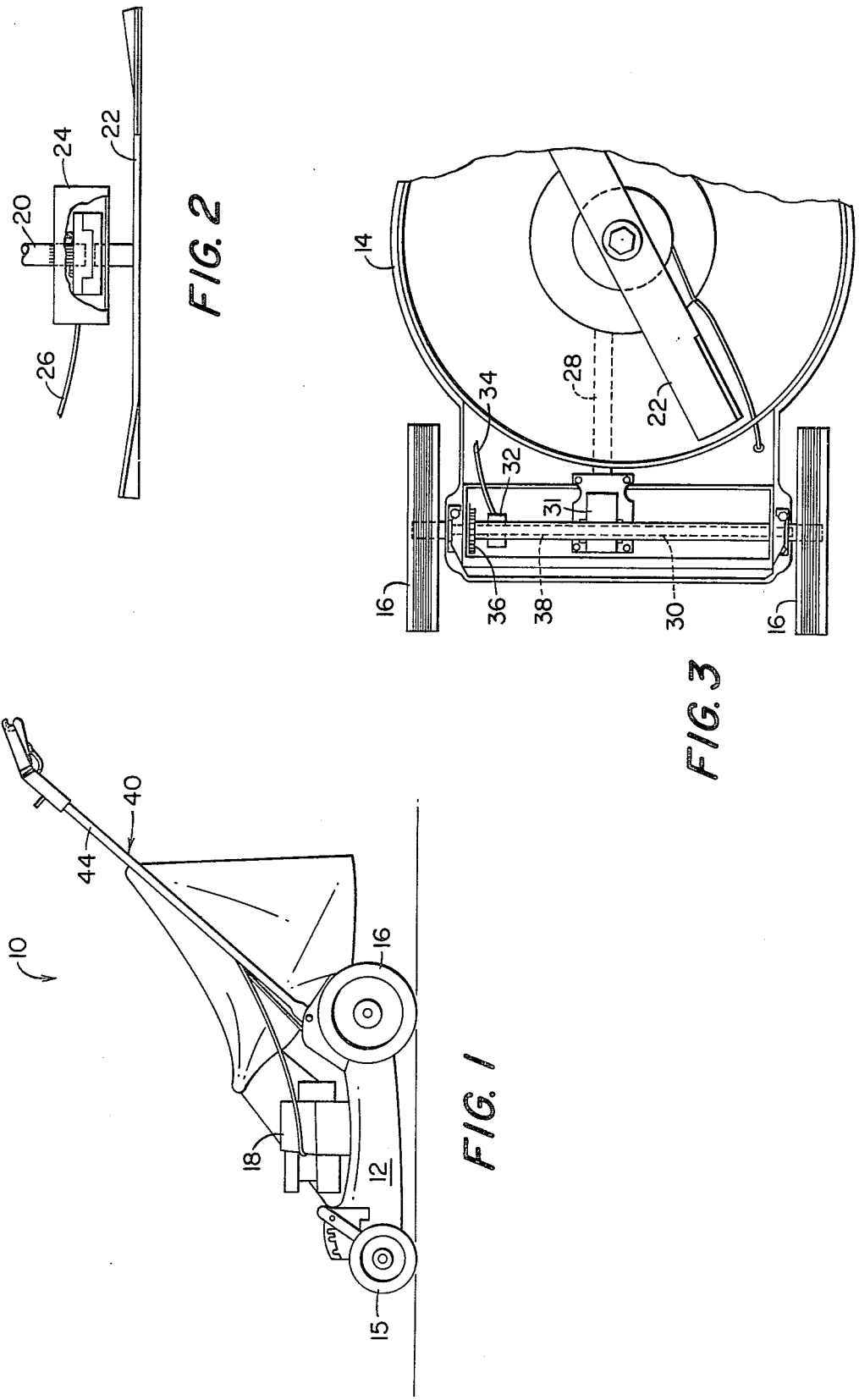

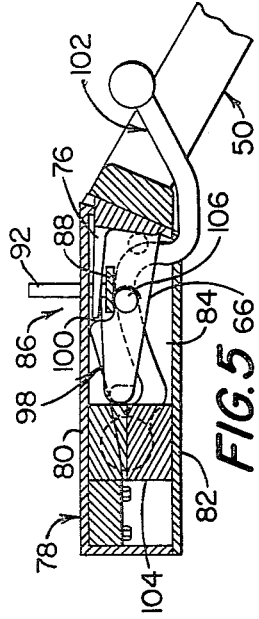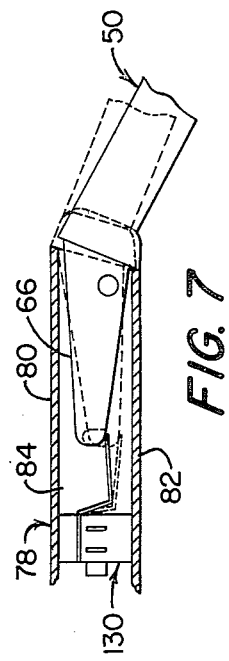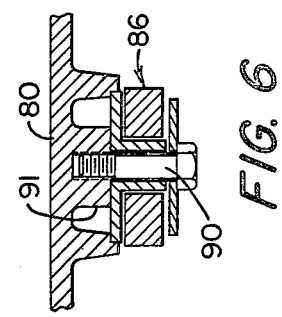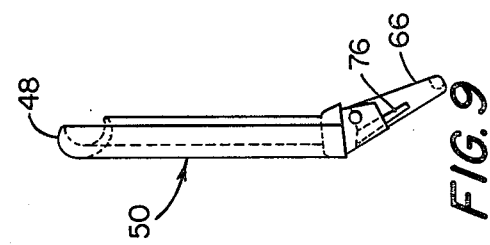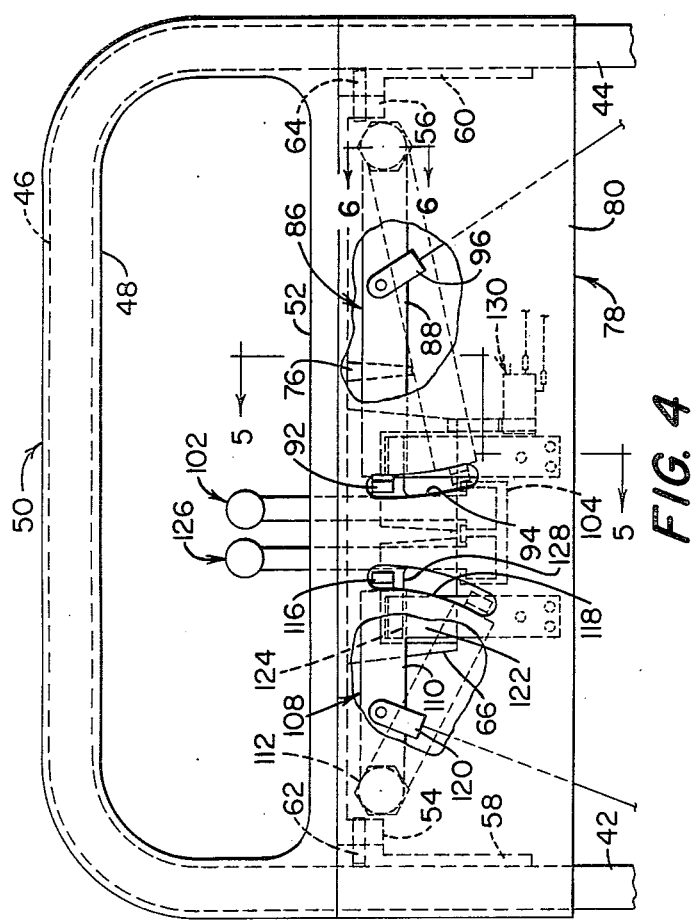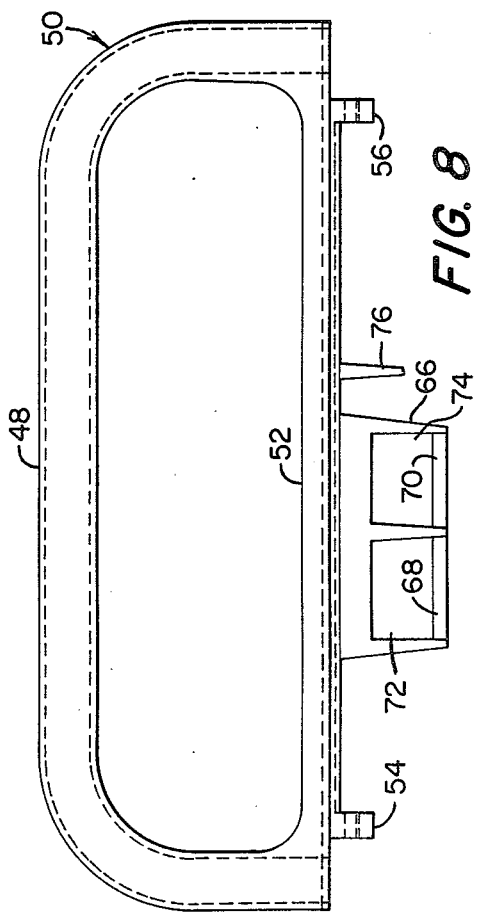

TWO-STAGE DEADMAN CONTROL FOR WALK-BEHIND MOWERS

BACKGROUND OF THE INVENTION

The present invention relates to controls for self-propelled, walk-behind implements and more specifically relates to such controls designed to require the operator to go through two stages or two steps of lever actuation to accomplish engagement of each of the traction and tool drives of the implement.

A known two-stage control for a lawn mower is illustrated and described in U.S. patent application Ser. No. 005,133 filed by John J. Hoch on Jan. 22, 1979 and entitled Two-stage Deadman Control for Walk-Behind Mower filed by the same assignee. The control disclosed in the Hoch application includes a traction drive control lever biased toward a normal clutch-disengage position and movable to a clutch-engage position in which it is held by a deadman control lever after the latter is moved, against the force of a biasing spring, from a normally released position to an actuated position wherein it is gripped against the mower guide handle. The disclosure alludes to a mower having a blade drive control clutch operated by the deadman control lever such that it is selectively engageable independently of the traction drive clutch. This latter operation is not satisfactory, however, since it is just as important from a safety standpoint to protect against inadvertent operation of the blade drive as it is to protect against inadvertent operation of the traction drive.

SUMMARY OF THE INVENTION

According to the present invention, there is provided an improved two-stage control for traction and working tool drive clutches of a self-propelled, walk-behind implement.

An object of the invention is to provide two-stage controls for traction and tool drive clutches which include a single deadman control lever.

Another object of the invention is to provide two-stage controls for traction and tool drive clutches which include a deadman control lever that blocks movement of the tool drive clutch control lever to a clutch-engage position when the deadman control lever is in its normal, released position.

Yet another object is to provide two-stage controls for traction and tool drive clutches including a deadman control lever which actuates a pair of lever latches such that they respectively retain traction and tool drive clutch operating levers in respective clutch engage positions when the deadman control lever is in its operative position gripped against the implement guide handle.

Still another object is to provide two-stage controls, as set forth in the immediately preceding object, wherein a pair of latch release levers are respectively coupled to the lever latches and selectively operable to effect release of one or the other of the traction and tool drive clutch operating levers to its normal clutch-disengage position.

These and other objects will become apparent from a reading of the ensuing description together with the appended drawings.

BRIEF DESCRIPTION OF THE DRAWINGS

FIG. 1 is a left side elevational view of a self-propelled, walk-behind lawn mower embodying controls constructed in accordance with the principles of the present invention.

FIG. 2 is a somewhat schematic representation of a mower blade drive including a normally spring-disengaged blade drive clutch.

FIG. 3 is a somewhat schematic bottom view of the mower showing the traction drive including a normally spring-disengaged traction drive clutch.

FIG. 4 is an orthogonal top plan view of the rear portion of the mower guide handle and the control mounted thereon with parts broken away for clarity.

FIG. 5 is an enlarged sectional view taken along the line 5—5 of FIG. 4 and showing the relationships of the control lever, lever latch and latch release lever to one another.

FIG. 6 is an enlarged sectional view taken along line 6—6 of FIG. 4 and showing the pivotal connection of one of the clutch control levers.

FIG. 7 is a left side elevational enlarged sectional view, partly in section, showing the relationship between an ignition interlock switch and the deadman control lever.

FIG. 8 is an orthogonal top plan view of the deadman control lever.

FIG. 9 is a right end view of the lever shown in FIG. 8.

DESCRIPTION OF THE PREFERRED EMBODIMENT

Referring now to the drawings, in FIG. 1 is shown a self-propelled, walk-behind lawn mower indicated in its entirety by the reference numeral 10. The mower 10 includes a frame 12 forming a blade housing 14 (FIG. 3) and supported on a pair of front ground wheels 15 (only one shown) and on a pair of rear traction drive wheels 16. Mounted centrally on the frame 12 is an engine 18 having a vertical output shaft 20 (FIG. 2) to which a mower blade 22 may be selectively coupled by a normally disengaged blade drive clutch 24 having a control cable 26 connected thereto for actuation, in a manner to be presently described, to effect engagement of the clutch 24. A fore-and-aft extending traction drive shaft 28 has its forward end preferably coupled to the engine output shaft 20 by gearing (not shown) which may be of any suitable type of which that disclosed in U.S. Pat. No. 2,688,224 issued to Hainke on Sept. 7, 1954 is an example. The rear end of the shaft 28 is coupled for driving a cross shaft 30 by gearing enclosed in a gear case 31, which gearing may be of any suitable type of which that disclosed in U.S. Pat. No. 2,941,610 issued to Clemson on June 21, 1960 is an example. The cross shaft 30 is split into right and left sections having a normally disengaged traction drive clutch 32 coupled therebetween and selectively engageable by a control cable 34, which is actuated in a manner to be presently described. A pinion gear (not visible) is coupled to the left section of the shaft 30 and is meshed with a gear 36 fixed on a drive axle 38 journalled in the frame 12 and having the drive wheels 16 secured to the opposite ends thereof.

The mower 10 is controlled in part by a guide handle 40, which is inclined upwardly and rearwardly from the frame 12 and includes transversely spaced legs 42 and 44 (FIG. 4) having respective forward ends secured to the frame 12 and respective rear ends joined together by a transverse grip portion 46.

The controls for operating the blade drive clutch control cable 26 and the traction drive clutch control cable 34 are mounted on the handle 40. Specifically, with reference to FIGS. 4–9, it can be seen that disposed in overlying relationship to and being of inverted U-shaped configuration for receiving the rear portion of the handle 40 where the grip portion 46 joins the legs 42 and 44 is a rearward portion 48 of a deadman control lever 50. The lever 50 has a forward transverse portion 52 extending between the legs 42 and 44 and including lugs 54 and 56 respectively disposed against brackets 58 and 60 fixed to respective inner surfaces of the legs 42 and 44, the lever 50 being vertically pivotally mounted by means of axially aligned pivot pins 62 and 64 respectively received in aligned holes in the lug 54 and bracket 58 and in aligned holes in the lug 56 and bracket 60. The transverse portion 52 of the lever 50 includes a forwardly projecting, latch operating tab 66 defining right and left latch-operating surfaces 68 and 70 and right and left openings 72 and 74 respectively located immediately behind the surfaces 68 and 70. The transverse portion 52 further includes a forwardly projecting clutch operating lever lock out stop 76 spaced just leftwardly of the tab 66.

Located just forwardly of the rear portion 48 of the lever 50 is a console 78 extending transversely between and having opposite ends secured to the handle legs 42 and 44. While the console 78 may take many forms, it is preferably constructed of upper and lower molded plastic members 80 and 82, respectively, connected together with a plurality of screws (not shown) such that a plurality of pins (not shown) of one of the members are retained in a plurality of holes (not shown) provided in the other of the members. The members 80 and 82 form a cavity 84 having an open rear end through which the tab 66 and stop 76 project.

Provided for controlling the blade drive clutch 24 is a blade drive clutch control lever 86 including a transverse section 88 located between the members 80 and 82 and having its left end pivotally mounted to the console 78 by an upright pivot pin 90 having a threaded upper end received in a threaded boss 91 formed integrally with the underside of the upper console member 80 at a left rear location thereof. The right end of the lever section 88 has an upright handle 92 secured thereto and located within a guide opening 94 formed arcuately about the axis of the pin 90. The blade drive clutch control cable 26 is secured to the lever section 88 at a point intermediate of its ends by a clevis 96 and is caused to effect engagement of the clutch 24 in response to the lever 86 being swung rearwardly about the pivot pin 90. As can best be seen in FIGS. 4 and 5 when the deadman control lever 50 is in a normal released position wherein the rearward portion 48 is elevated above the rear of the guide handle 40, the lockout stop 76 will prevent the blade drive clutch control lever 86 from being moved rearwardly from its clutch-disengage to its clutch-engage position. Upon the deadman control lever 50 being gripped against the guide handle, the stop 76 will be elevated to a location above the path of movement of the lever 86 to thus permit it to be swung rearwardly to its clutch-engage position.

Provided for retaining the lever 86 in its clutch-engage position, when the deadman control lever 50 is depressed, is a lever latch 98 in the form of a spring metal strap having a forward end clamped between the upper and lower console members 80 and 82 at a location forwardly of the left latch-operating surface 70 of the tab 66 and having an intermediate section extending rearwardly over the stop-actuating surface 70 and being bent to form a rearwardly facing stop surface 100 located above the left opening 74. When the deadman control lever 50 is in its released position, latch 98 will be in its normal undeflected position wherein stop surface 100 is located below the path swept by the blade drive clutch control lever 86 as the latter moves between its clutch-release and clutch-engage positions. When the deadman control lever 50 is in its gripped position, the latch-operating surface 70 of the lever 50 will act to hold the latch 98 in an upwardly deflected position, as shown in FIG. 5, wherein the stop surface 100 is disposed such as to prevent the lever 86 from moving from its clutch-engage to its clutch-disengage position.

Provided for selectively deflecting the latch 98 downwardly to release the lever 86 when the deadman control lever is in its depressed position is a left latch release lever 102 located such that an operator may actuate it with his left index finger while maintaining his grip on the deadman control lever 50. The lever 102 has a forward cylindrical end pivotally received in a bracket 104 formed in part by the upper console member 80 and in part by the lower console member 82. The lever 102 also includes a transverse projection 106 disposed beneath the opening 74 and the rearward end of the latch 98 is encircled about the projection 106. Thus, it will be appreciated that when the deadman control lever 50 is in its depressed position and the latch 98 is holding the lever 86 in its clutch-engage position, the latter may be released to automatically return to its clutch-disengage position by depressing the latch release lever 102 such as to deflect the latch 98 downwardly sufficiently to permit the lever 86 to pass thereover.

Similarly, provided for controlling the traction drive clutch 32 is a traction drive clutch control lever 108 having a transverse section 110 located between the console members 80 and 82 and having its right end pivotally mounted to the console 78 by an upright pivot pin (not shown) having a threaded upper end received in a threaded boss formed integrally with the underside of the upper console member 80 at a right rear location 112. The left end of the lever section 110 has an upright handle 116 secured thereto and received in a guide opening 118 formed arcuately in the console member 80 about the axis of the pivot pin. The traction drive clutch control cable 34 is coupled to the transverse lever section 110, at a point intermediate of its ends, by a clevis 120 and is caused to effect engagement of the clutch 32 in response to the lever 108 being swung rearwardly from a forward normally released clutch-disengage position to a rearward clutch-engage position.

Provided for retaining the lever 108 in its clutch-engage position, when the deadman control lever 50 is depressed, is a lever latch 122 constructed and mounted similarly to the abovedescribed latch 98. Thus, the latch 122 has a forward end clamped between the console members 80 and 82 at a location forwardly of the right latch-operating surface 68 of the tab 66 of the deadman control lever 50. The latch 122 extends above the surface 68 and is bent to form a rearwardly facing stop surface 124 located above the right opening 72 in the tab 66. When the latch 122 is in a normal, undeflected position, it is disposed below the path swept by the lever 108 when the latter moves between its clutch-disengage and clutch-engage positions. However, when the deadman control lever 50 is depressed, the surface 68 of the tab 66 holds the latch 122 in an upwardly deflected position wherein the stop surface 124 is disposed for preventing the lever 108 from swinging from its clutch-engage to its clutch-disengage position.

Provided for selectively operating the latch 122 for releasing the lever 108 to permit the latter to automatically return to its normal clutch-disengage position, while the deadman lever 50 is depressed, is a latch release lever 126 located such that an operator may actuate it with his right index finger while maintaining his grip on the deadman control lever 50. The lever 126 has a forward cylindrical end pivotally received in the bracket 104 in side-by-side relationship to the forward cylindrical end of the latch release lever 102. The lever 126 also includes a transverse projection 128 disposed beneath the opening 72 in the tab 66 and the rearward end of the latch 122 is encircled about the projection 128. Thus, it will be appreciated that when the latch 122 is in its upward deflected position blocking the lever 108 from returning to its clutch-disengage position, the latch release lever 126 may be depressed to deflect the latch 122 downwardly a sufficient amount to release the lever 108.

It is to be noted that the lever latches 98 and 122 also function to bias the deadman control lever 50 to its released position.

The operation of the deadman control lever 50 is interlocked with an engine ignition circuit of a type including a safety loop including one or more switches which are required to be closed in order for the engine to start, the engine then continuing to run irrespective of the condition of the switch. Thus, a normally open switch 130 is mounted on the console 78 for actuation by the tab 66 of the lever 50, the switch 130 being closed to permit starting when the lever 50 is in its released position and being open to prevent starting when the lever 50 is in its depressed position.

BRIEF DESCRIPTION OF THE OPERATION

Starting of the mower engine 18 is normally accomplished by an operator while he is standing beside the mower. Thus the deadman control lever 50 will be in its released position and the blade drive clutch control lever 86 and the traction-drive clutch control lever 108 will both be in their respective forward clutch-disengage positions. As the tab 66 of control lever 50 will be positioned such as to permit the switch 130 to assume its normally closed position, the engine 18 will start upon being cranked by the operator. However, supposing the operator has tied the deadman control lever 50 in its depressed position in an attempt to bypass the safety function thereof, the switch 130 will be held open by the tab 66 and the engine will fail to start when cranked by the operator.

Once the engine 18 is started, the operator may engage the traction drive to propel the mower to an area to be mowed by first depressing the deadman control lever 50 against the guide handle 40 so as to deflect the lever latch 122 upwardly and then by moving the control lever 108 rearwardly resulting in the latch 122 being deflected downwardly until the lever 108 reaches its clutch-engage position wherein it is past the stop surface 124 of the latch 122 which permits the latter to return to its upwardly deflected position. The stop surface 124 is then positioned to prevent the lever 108 from returning to its forward clutch-disengage position. Upon arriving at the area to be mowed, the operator needs only to move the blade drive clutch control lever 86 to its rearward clutch-engage position, the lever 86 then being held in this position by the stop surface 100 of the lever latch 98.

Should the operator desire to disengage the traction drive but not the blade drive as might be the case when performing certain trimming operations, he needs only to reach the latch release lever 126 with the index finger of his right hand and press the lever 126 downwardly to deflect the latch 122 to permit the lever 108 to automatically return to its forward clutch-disengage position.

Similarly, should the operator desire to disengage the blade drive without disengaging the traction drive, as might be the case when traveling from an area just mowed to an area to be mowed, he needs only to reach the latch release lever 102 with the index finger of his left hand and depress the lever downwardly to effect sufficient downward deflection of the lever latch 98 to permit the lever 86 to automatically return to its clutch-disengage position.

Supposing that an operator should stumble and fall during mowing operation and in so doing release the deadman control lever 50, the latches 98 and 122 will assume their respective normal undeflected positions to thus permit the levers 86 and 108 to automatically return to their respective normally forward clutch-disengage positions wherein both the blade and traction drives are interrupted.

Accordingly, it will be appreciated that the controls of the present invention are designed to reduce the chances of inadvertent or unintentional operation by requiring a two-stage or two-step operation to be performed to accomplish blade and traction drive engagement while being designed to permit easy operator control for effecting traction and blade drive engagement independently of each other.

I claim:

1. A self-propelled walk-behind implement and controls therefor including a normally disengaged tool drive clutch; a normally disengaged traction drive clutch; a guide handle having a first transverse grip portion; first and second clutch control levers respectively pivotally mounted on the handle for movement between forward clutch-disengage and rearward clutch-engage positions; first and second actuator means respectively coupled between the first lever and tool drive clutch, and between the second lever and traction drive clutch; lever latch means mounted on the handle for selectively retaining the first and second levers in their respective clutch-engage positions and including a deadman control lever including a second transverse grip portion and being vertically pivotally mounted on the handle for movement between a normal released position, wherein the second transverse grip portion is elevated above the first grip portion and an operative position wherein the second grip portion is held against the first grip portion; said lever latch means further including first and second resiliently yieldable latches operatively connected to the deadman control lever and mounted for movement, in response to movement of the deadman control lever, between respective normal lever-unlock positions, disposed out of the paths of movement of the first and second levers when the deadman control lever is in its released position, and respective lever-lock positions disposed in the paths of movement of the first and second levers when the deadman control lever is in its operative position; and first and second latch release means respectively operatively connected to the first and second latches for selectively yielding the latter to their lever-unlock positions when the deadman control lever is in its operative position.

2. The self-propelled, walk-behind implement and controls therefor defined in claim 1 wherein a stop surface is fixed integrally to the deadman control lever and pivotable therewith between first and second positions respectively occupied when the deadman control lever is in its released and operative positions and respectively located relative to the first lever to prevent and allow movement of the latter from its clutch-disengage to its clutch-engage position.

3. The self-propelled, walk-behind implement and controls therefor defined in claim 1 and further including a normally open ignition interlock switch mounted adjacent to the deadman control lever for being closed thereby only when the deadman control lever is in its released position.

4. The self-propelled, walk-behind implement and controls therefor defined in claim 1 wherein said first and second resiliently yieldable latches are separate from the deadman control lever; and said deadman control lever having a latch-operating surface disposed in abutting relationship to the latches and thus forming the operative connection between the deadman control lever and the latches.

5. The self-propelled, walk-behind implement and controls therefor defined in claim 4 wherein the first and second laches are respectively in the form of first and second leaf springs.

6. The self-propelled, walk-behind implement and controls therefor defined in claim 5 wherein the first and second latch release means are respectively formed by first and second latch release levers pivotally mounted on the handle and respectively coupled to the first and second leaf springs.

7. The self-propelled, walk-behind implement and controls therefor defined in claim 1 wherein said guide handle includes opposite legs joined together by the first grip portion and a console structure extending between and joined to the opposite legs at a location forwardly of the first grip position; said first and second resiliently yieldable latches respectively being in the form of first and second leaf springs having first ends fixed to the console structure; and said deadman control lever including a latch operating surface engaged with the springs at respective locations spaced from said first ends and thus forming the operative connection between the deadman control lever and the latches.

8. The self-propelled, walk-behind implement and controls therefor defined in claim 7 wherein the first and second latch release means are formed by first and second latch release levers pivotally mounted on the handle and respectively coupled to respective second ends of the first and second leaf springs.

9. A self-propelled, walk-behind implement and controls therefor including normally disengaged tool drive and traction drive clutches; a guide handle having opposite legs joined by a first transverse grip portion and including a console structure extending between and joined to the legs forwardly of the grip portion; a deadman control lever including a second transverse grip portion and being vertically pivotally mounted on the handle for movement between released and operative positions wherein the second transverse grip portion are respectively elevated above and held against the first transverse grip position; first and second control levers pivotally mounted on the console structure for movement along paths extending generally parallel thereto, between respective forward clutch-disengage positions and respective rearward clutch-engage positions; first and second lever latches respectively comprising first and second fore-and-aft extending leaf springs normally disposed beneath said paths and having forward ends fixed to the console structure; said deadman control lever including latch-actuating surface means extending forwardly beyond the pivotal connection of the deadman control lever with the handle and engaged with respective undersurface locations of the first and second lever latches whereby movement of the second grip portion of the deadman control lever downwardly into engagement with the first grip portion will result in the first and second lever latches being deflected upwardly to respective lever-latch positions wherein they are located in said paths so as to be positioned to retain the first and second levers in their respective clutch-engage positions; and first and second latch release levers vertically pivotally mounted on the console structure respectively adjacent the first and second latches and being respectively operatively connected to the first and second latches for selectively deflecting the latter downwardly below said paths in response to the latch release levers being moved between respective upper released positions and respective lower depressed positions.

10. The self-propelled, walk-behind implement defined in claim 9 wherein the first and second latches are mounted in side-by-side relationship to each other and wherein the first and second latch release levers are mounted in side-by-side relationship to each other.

11. The self-propelled, walk-behind implement defined in claim 9 wherein the deadman control lever includes opening means located therein immediately behind said latch actuating surface; and first and second latches extending above the opening means and being respectively deflectable downwardly thereinto in response to the first and second latch release levers being moved to their respective depressed positions while the deadman control lever is in its operative position.

12. The self-propelled, walk-behind implement defined in claim 11 wherein the first and second latches extend downwardly through the opening means and terminate in respective rear ends located below the opening means; and the first and second latch release levers respectively being connected to the rear ends of the first and second latches.

13. The self-propelled, walk-behind implement defined in claim 10 wherein the first and second latch release levers respectively include cylindrical forward end portions; the console structure including upper and lower releasably interconnected superposed sections cooperating to define a cylindrical receptacle receiving the cylindrical forward end portions of the latch release levers to thereby define the pivotal connection of the latch release levers with the console structure.

14. The self-propelled, walk-behind implement defined in claim 13 wherein the superposed sections cooperate to define a cavity; the first and second clutch control levers include respective transverse sections located in the cavity and having respective ends pivotally connected to underside locations of the upper one of the superposed sections; said upper one of the superposed sections including respective guide openings formed arcuately therein about the pivotal connection of the ends of the first and second clutch control levers; and the first and second control levers respectively including upright handles forming integral extensions of the transverse sections and received in the guide openings.

* * * * *